J. Adams,
Corn Planter,

N° 68,026. Patented Aug. 20, 1867.

Witnesses:
Chas. A. Pettit
Solon C. Kemon

Inventor:
Jesse Adams
per Munn & Co.
Attorneys

United States Patent Office.

JESSE ADAMS, OF CLARKSVILLE, TEXAS.

Letters Patent No. 68,026, dated August 20, 1867.

IMPROVEMENT IN COMBINED PLANTER AND CULTIVATOR.

*The Schedule referred to in these Letters Patent and making part of the same.*

TO ALL WHOM IT MAY CONCERN:

Be it known that I, JESSE ADAMS, of Clarksville, in the county of Red River, and State of Texas, have invented a new and improved Combined Planter and Cultivator; and I do hereby declare the following to be a full, clear, and exact description of the same, reference being had to the accompanying drawings, forming part of this specification, and in which—

Figure 5:
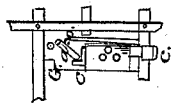
Figure 4:
Figure 1:
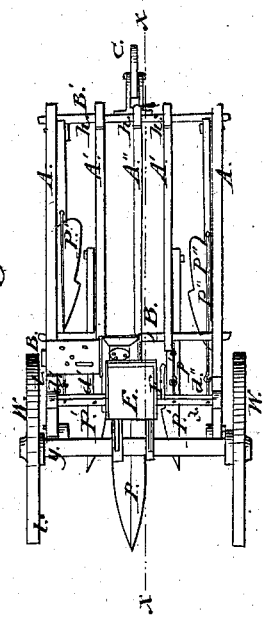
Figure 2:
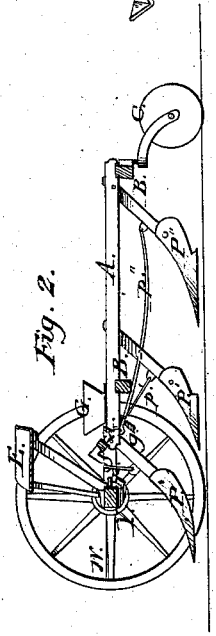

Figure 1 is a top view of my invention.
Figure 2 is a side elevation of the same.
Figure 3 is a bottom view of the agitator connected with the seed-box.
Figure 4 is a view of the lever $c$.

Similar letters of reference indicate corresponding parts in the several figures.

The object of this invention is to produce a simple, practical combined planter and cotton and corn cultivator, which shall be easily adjusted and operated, and shall be cheap and durable.

In order that others skilled in the art to which my invention appertains may be enabled to make and use the same, I will proceed to describe it in detail.

In the drawings, A A' A'' represent the longitudinal beams, and B B' the cross-beams of the frame, the whole resting on two forward wheels W W, running on an axle, Y, and one rear caster-wheel C, the bearing of which is a vertical socket attached to the rear cross-beam B'. Pivoted to the forward end of the centre beam A'' is the forward or centre plough P, a double mould-board plough, throwing the dirt both right and left. Behind it, pivoted to the two beams A' A', between the centre beam and side beams, and just in the rear of the forward cross-beam B, are two ploughs, P' P', the right plough having a left and the left a right mould-board. Behind these ploughs, again, are two other similar ploughs, P'' P'', pivoted to the side beams A A at the point where they are attached to the rear cross-beams B'. Suitable braces, $p$ $p'$ $p''$, connect the plough-standards with short stout arms $d$ $d'$ $d''$, projecting from a transverse roller, D, just behind the driver's seat E. An upright lever, F, enables the driver to raise the ploughs from the ground in order to clear obstacles. The seed-box G is situated directly behind the driver's seat, and is provided with a seed-conductor, $g$, and a perforated bottom, with a valve, $a$, to alternately open and close the bottom. The valve $a$ is fixed to a movable vertical pivot, which runs down through the bottom of the seed-box, and is connected with a horizontal lever, $c$, in such a manner that when the outer end of the lever is thrown forward the valve will be opened, and when thrown back again the valve will be closed. The end of the lever is struck by pins $t$ $t$, projecting from the inner side of the wheel, which throw the lever forward, and a spring, $o$, is attached, which throws it back as soon as the pin has passed. The head or end of the lever is bevelled properly, or provided with a cam or bevelled plate, over which the pin $t$ travels with but little friction. One or more seed-boxes may be attached. For the lever $c$, a sliding-rod connected with the valve $a$, and vibrated back and forth by the alternate action of the pins $t$ $t$ and spring $o$, might be substituted, if preferred.

The machine is now ready for planting, the forward plough cutting the furrow, the seed-box planting the seed, and the rear ploughs throwing the earth inward and covering the seed. For cultivating corn, the ploughs are changed from side to side, so as to throw the earth outward. For ordinary ploughing, a whole set of right or left ploughs may be attached. The front plough may be detached when necessary, or it may be attached at the rear end of either of the beams A' A' or A'', suitable holes $h$ $h$ being provided there to hold its pivot bolt.

Having thus described my invention, what I claim as new, and desire to secure by Letters Patent, is—

1. The agitating and distributing attachment above described, consisting of the perforated bottom of the box G, in combination with the valve $a$, lever $c$, and pins $t$ $t$ on the wheel W, all constructed and operating in combination with each other, substantially in the manner and for the purpose specified.

2. The combined planter and cultivator above described, constructed and operated substantially as set forth.

JESSE ADAMS.

Witnesses:
 CHAS. A. PETTIT,
 SOLON C. KEMON.